(12) United States Patent
Chen et al.

(10) Patent No.: US 9,276,435 B2
(45) Date of Patent: Mar. 1, 2016

(54) METHOD AND APPARATUS FOR WIRELESSLY RECEIVING POWER

(71) Applicant: O2Micro Inc., Santa Clara, CA (US)

(72) Inventors: Jun Chen, Chengdu (CN); Qiang Wang, Chengdu (CN); Mei Yu, Chengdu (CN); Xinsheng Peng, Wuhan (CN); James Wang, San Jose, CA (US)

(73) Assignee: MAISHI ELECTRONIC (SHANGHAI) LTD., Shanghai (CN)

( * ) Notice: Subject to any disclaimer, the term of this patent is extended or adjusted under 35 U.S.C. 154(b) by 617 days.

(21) Appl. No.: 13/667,024

(22) Filed: Nov. 2, 2012

(65) Prior Publication Data

US 2014/0125138 A1 May 8, 2014

(51) Int. Cl.
*H02J 7/02* (2006.01)

(52) U.S. Cl.
CPC .................................... *H02J 7/025* (2013.01)

(58) Field of Classification Search
CPC ........... H02J 17/00; H02J 5/005; H02J 7/025; H02J 3/01; H01F 38/14; B60L 11/182; B60L 11/1829; B60L 11/1831; Y02T 90/122; H04B 5/0037
See application file for complete search history.

(56) References Cited

U.S. PATENT DOCUMENTS

| | | | |
|---|---|---|---|
| 6,898,193 B2 * | 5/2005 | Saifuddin | H04W 52/48 370/252 |
| 2003/0072273 A1 * | 4/2003 | Aiello | H04B 1/7163 370/310.2 |
| 2008/0122297 A1 * | 5/2008 | Arai | G06Q 50/06 307/154 |
| 2009/0135752 A1 * | 5/2009 | Su | H04W 52/029 370/311 |
| 2009/0251008 A1 | 10/2009 | Sugaya et al. | |
| 2009/0271047 A1 | 10/2009 | Wakamatsu | |
| 2010/0013322 A1 * | 1/2010 | Sogabe | H04B 5/0093 307/104 |
| 2011/0273138 A1 | 11/2011 | Baarman et al. | |
| 2012/0161536 A1 | 6/2012 | Kamata et al. | |
| 2013/0026851 A1 | 1/2013 | Taguchi | |

FOREIGN PATENT DOCUMENTS

| | | |
|---|---|---|
| CN | 102593957 A | 7/2012 |
| JP | 2005137040 A | 5/2005 |
| JP | 2010011650 A | 1/2010 |
| JP | 2010028935 A | 2/2010 |
| JP | 2010104098 A | 5/2010 |

(Continued)

OTHER PUBLICATIONS

Office Action issued in Japanese Patent Application No. 2013-210107 dated Oct. 6, 2014.

*Primary Examiner* — Jared Fureman
*Assistant Examiner* — Rafael Pacheco
(74) *Attorney, Agent, or Firm* — Pillsbury Winthrop Shaw Pittman LLP

(57) ABSTRACT

Method and apparatus for a receiving device to wirelessly receive electric power from a transmitting device. A power capacity is configured at the receiving device, based on a default power capacity known by both the receiving device and the transmitting device. A first value of a dependent parameter is read. The dependent parameter is associated with the electric power and varies in accordance with an independent parameter adjustable by the transmitting device. A second value of the dependent parameter is then read. A maximum power capacity of the transmitting device is identified based on at least the first and second values and a predetermined threshold. The electric power is then received from the transmitting device.

29 Claims, 10 Drawing Sheets

(56) References Cited

FOREIGN PATENT DOCUMENTS

| | | |
|---|---|---|
| JP | 2012048750 A | 3/2012 |
| JP | 2012205379 A | 10/2012 |
| TW | 201236302 A | 9/2012 |
| WO | 2011128969 A1 | 10/2011 |

\* cited by examiner

| Header | Packet Types | Message Size |
|---|---|---|
| *ping phase* | | |
| 0x01 | Signal Strength | 1 |
| 0x02 | End Power Transfer | 1 |
| *identification & configuration phase* | | |
| 0x06 | Power Control Hold-off | 1 |
| 0x51 | Configuration | 5 |
| 0x71 | Identification | 7 |
| 0x81 | Extended Identification | 8 |
| *power transfer phase* | | |
| 0x02 | End Power Transfer | 1 |
| 0x03 | Control Error | 1 |
| 0x04 | Rectified Power | 1 |
| 0x05 | Charge Status | 1 |
| *identification & configuration / power transfer phase* | | |
| 0x18 | Proprietary | 1 |
| 0x19 | Proprietary | 1 |
| 0x28 | Proprietary | 2 |
| 0x29 | Proprietary | 2 |
| 0x38 | Proprietary | 3 |
| 0x48 | Proprietary | 4 |
| 0x58 | Proprietary | 5 |
| 0x68 | Proprietary | 6 |
| 0x78 | Proprietary | 7 |
| 0x84 | Proprietary | 8 |
| 0xA4 | Proprietary | 12 |
| 0xC4 | Proprietary | 16 |
| 0xE2 | Proprietary | 20 |
| 0xF2 | Proprietary | 24 |

FIG. 10

METHOD AND APPARATUS FOR WIRELESSLY RECEIVING POWER

BACKGROUND

1. Technical Field

The disclosure relates generally to a method and apparatus for wirelessly receiving power.

2. Discussion of Technical Background

Wireless power transmission is the transmission of electrical energy from a power source to an electrical load without interconnecting manmade conductors. The most common form of wireless power transmission is carried out using direct induction followed by resonant magnetic induction. Other methods include electromagnetic radiation in the form of microwaves or lasers and electrical conduction. Wireless power transmission has been used for battery charging, or other suitable loads, in a wide range of mobile devices, such as mobile phone, camera, music player, headset, etc.

In a wireless power transmission system, the receiving device (receiver) may provide control information to the transmitting device (transmitter) by, for example, load modulation on the power signal. Based on the received control information, the transmitting device may adjust a certain parameter associated with the transmitted electric power, e.g., the frequency, to the desired level in order to drive the load coupled to the receiving device. Known standards, such as QI communication protocol (Wireless Power Consortium), define how the receiving device and the transmitting device communicate their power needs to each other over the same magnetic coupling used for power transmission. For example, after the initial communication between the receiving and transmitting devices is established at a default pulse-width-modulation (PWM) frequency of 175 kHz, the transmitting device transmits electric power to the receiving device with an output power up to 5 W, as supported by the current QI communication protocol. However, as some transmitting devices and receiving devices can support higher output power than 5 W, there may be a mismatch of the maximum power supported by the transmitting and receiving devices in the wireless power transmission system. Moreover, if both the transmitting and receiving devices operate with 5 W maximum, regardless of their maximum power supports, there may be a waste of resource or a loss of efficiency since both the transmitting and receiving devices may support a higher power, e.g., 10 W.

Accordingly, there exists a need for a solution for wireless power transmission to solve the above-mentioned problems.

SUMMARY

The present disclosure describes methods, apparatus, and programming for wirelessly receiving power.

In one example, a method for a receiving device to wirelessly receive electric power from a transmitting device is provided. A power capacity is configured at the receiving device, based on a default power capacity known by both the receiving device and the transmitting device. A first value of a dependent parameter is read. The dependent parameter is associated with the electric power and varies in accordance with an independent parameter adjustable by the transmitting device. A second value of the dependent parameter is then read. A maximum power capacity of the transmitting device is identified based on at least the first and second values and a predetermined threshold. The electric power is then received from the transmitting device.

In another example, an apparatus including a receiving device is provided. The receiving device includes a power reception unit, a configuration unit, a reading unit, and an identification unit. The power reception unit is configured to wirelessly receive electric power from a transmitting device. The configuration unit is operatively coupled to the power reception unit and configured to configure a power capacity based on a default power capacity known by both the receiving device and the transmitting device. The reading unit is operatively coupled to the power reception unit and configured to read a first value and a second value of a dependent parameter. The dependent parameter is associated with the electric power and varies in accordance with an independent parameter adjustable by the transmitting device. The identification unit is operatively coupled to the configuration unit and the reading unit and configured to identify a maximum power capacity of the transmitting device based on at least the first and second values and a predetermined threshold.

In still another example, a system for wirelessly receiving power is provided. The system includes a receiving device and a transmitting device. The receiving device includes a power reception unit, a configuration unit, a reading unit, and an identification unit. The power reception unit is configured to wirelessly receive electric power from a transmitting device. The configuration unit is operatively coupled to the power reception unit and configured to configure a power capacity based on a default power capacity known by both the receiving device and the transmitting device. The reading unit is operatively coupled to the power reception unit and configured to read a first value and a second value of a dependent parameter. The dependent parameter is associated with the electric power and varies in accordance with an independent parameter adjustable by the transmitting device. The identification unit is operatively coupled to the configuration unit and the reading unit and configured to identify a maximum power capacity of the transmitting device based on at least the first and second values and a predetermined threshold. The transmitting device includes a power transmission unit configured to wirelessly transmit the electric power to the receiving device.

In yet another example, a machine readable and non-transitory medium having information recorded thereon for a receiving device to wirelessly receive electric power from a transmitting device, wherein the information, when read by the machine, causes the machine to perform a series of steps. A power capacity is configured at the receiving device, based on a default power capacity known by both the receiving device and the transmitting device. A first value of a dependent parameter is read. The dependent parameter is associated with the electric power and varies in accordance with an independent parameter adjustable by the transmitting device. A second value of the dependent parameter is then read. A maximum power capacity of the transmitting device is identified based on at least the first and second values and a predetermined threshold. The electric power is then received from the transmitting device.

In yet another example, a method for a receiving device to wirelessly receive electric power from a transmitting device is provided. A power capacity is configured at the transmitting device, based on a default power capacity known by both the receiving device and the transmitting device. The electric power is then transmitted to the receiving device. The receiving device reads a first value and a second value of a dependent parameter associated with the electric power, and identifies a maximum power capacity of the transmitting device based on at least the first and second values and a predetermined threshold. The dependent parameter varies in accordance with an independent parameter adjustable by the transmitting device.

In yet another example, an apparatus including a transmitting device is provided. The transmitting device includes a configuration unit and a power transmission unit. The configuration unit is configured to configure a power capacity based on a default power capacity known by both a receiving device and the transmitting device. The power transmission unit is operatively coupled to the configuration unit and configured to transmit electric power to the receiving device. The receiving device reads a first value and a second value of a dependent parameter associated with the electric power, and identifies a maximum power capacity of the transmitting device based on at least the first and second values and a predetermined threshold. The dependent parameter varies in accordance with an independent parameter adjustable by the transmitting device.

BRIEF DESCRIPTION OF THE DRAWINGS

The embodiments will be more readily understood in view of the following description when accompanied by the below figures and wherein like reference numerals represent like elements, wherein:

FIG. 10 is a table illustrating an exemplary list of various packets for wireless power transmission, in accordance with one embodiment of the present disclosure.

DETAILED DESCRIPTION

Figure 1:
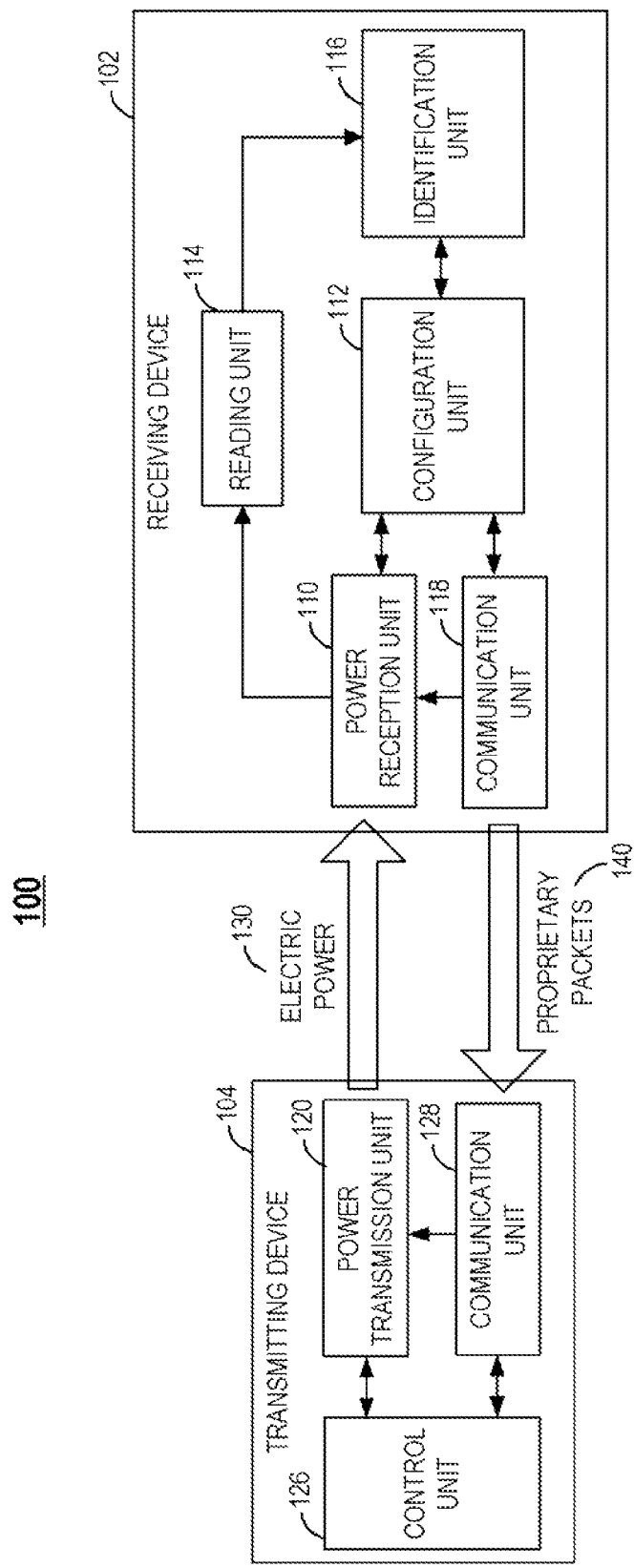
FIG. 1 is a block diagram illustrating an example of a system for wireless power transmission including a transmitting device and a receiving device, in accordance with one embodiment of the present disclosure.

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

Furthermore, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Various embodiments in accordance with the present disclosure provide a method and apparatus for identifying a maximum power capacity in wireless power transmission. The maximum power capacity is referred to the maximum power supported by a transmitting device or a receiving device in the wireless power transmission. According to the current QI communication protocol, a default power capacity, i.e., a default value of supported maximum power, is set to 5 W. The method and apparatus disclosed herein may allow the transmitting device and the receiving device to identify the maximum power capacity from each other.

Therefore the transmitting device and the receiving device may configure a power capacity for wireless power transmission based on the identified maximum power capacity. Moreover, the method and apparatus disclosed herein also support existing wireless power transmission standards, such as the QI communication protocol, and thus, are compatible with any QI-compatible transmitting or receiving device with 5 W default power capacity. In one example, the method and apparatus disclosed herein may allow a transmitting device of 10 W maximum power capacity to transmit electric power to a receiving device of 5 W maximum power capacity, at a power capacity 5 W. In another example, the method and apparatus disclosed herein may allow a transmitting device of 5 W maximum power capacity to transmit electric power to a receiving device of 10 W maximum power capacity, at a power capacity 5 W. In still another example, the method and apparatus disclosed herein may allow a transmitting device of 10 W maximum power capacity to transmit electric power to a receiving device of 10 W maximum power capacity, at a power capacity 10 W.

Additional advantages and novel features will be set forth in part in the description which follows, and in part will become apparent to those skilled in the art upon examination of the following and the accompanying drawings or may be learned by production or operation of the examples.

FIG. 1 illustrates one example of a system 100 for wireless power transmission, in accordance with one embodiment of the present disclosure. The system 100 may be any suitable wireless power transmission system that includes a receiving device 102 and a transmitting device 104. Electric power 130 is wirelessly transmitted from the transmitting device 104 to the receiving device 102 by any known mechanism, such as but not limited to, resonant magnetic induction, electromagnetic radiation, or electrical conduction. The same mechanism for power transmission may be also used for sending control information from the receiving device 102 to the transmitting device 104 for adjusting any parameter, such as voltage, frequency, or duty cycle, associated with the electric power to a desired level. In one example, the control information may be sent via a standard packet being compatible with existing standards, such as the QI communication protocol. In another example, the control information may be sent via proprietary packets 140 agreed on by both the transmitting device 104 and the receiving device 102. The proprietary packets 140 may be not included in existing standards.

In this example, the receiving device 102 may be part of an apparatus. And the apparatus may be any suitable electronic device, such as but is not limited to, a laptop computer, netbook computer, digital camera, digital camcorder, handheld device (e.g., dumb or smart phone, tablet, etc.), gaming console, set-top box, music player, global positioning system (GPS), or any other suitable device. In other examples, the receiving device 102 may be a discrete electronic device for providing power to a load.

In this example, the receiving device 102 includes a power reception unit 110, a configuration unit 112, a reading unit 114, an identification unit 116, and a communication unit 118. The power reception unit 110 is configured to wirelessly receive electric power from the transmitting device 104. The configuration unit 112 is operatively coupled to the power reception unit 110 and is configured to configure a power capacity at the receiving device 102 for the wireless power transmission. In one example, the configuration unit 112 may configure a power capacity based on a default power capacity known by both the receiving device 102 and the transmitting device 104. The default power capacity may be compatible with the current QI communication protocol, which supports up to 5 W power delivery. In another example, the configuration unit 112 may configure a power capacity based on a maximum power capacity of the transmitting device 104. The maximum power capacity of the transmitting device 104 may be greater than the default power capacity. The reading unit 114 is operatively coupled to the power reception unit 110 and is configured to read a first value and a second value of a dependent parameter associated with the electric power 130. The dependent parameter varies in accordance with an independent parameter adjustable by the transmitting device 104. The identification unit 116 is operatively coupled to the configuration unit 112 and the reading unit 114. The identification unit 116 is configured to identify a maximum power capacity of the transmitting device 104 based on at least the first and second values and a predetermined threshold. The communication unit 118 is operatively coupled to the configuration unit 112 and the power reception unit 110. The communication unit 118 is configured to send control information to the transmitting device 104. The control information may be sent in accordance with a communication protocol, such as the QI communication protocol, for example, by the same electromagnetic coupling mechanism used for power transmission. The control information in this example is sent via proprietary packets 140 agreed on by both the transmitting device 104 and the receiving device 102.

The transmitting device 104 may be any suitable base station for wirelessly providing electric power to the receiving device 102. In this example, the transmitting device 104 includes a power transmission unit 120, a control unit 126, and a communication unit 128. The power transmission unit 120 is configured to wirelessly transmit the electric power 130 to the receiving device 102. The communication unit 128 is operatively coupled to the power transmission unit 120 and configured to receive the control information, via proprietary packets 140 in this example, from the receiving device 102. The control unit 126 is operatively coupled to the power transmission unit 120 and the communication unit 128. The control unit 126 is configured to, upon receiving a proprietary packet for adjustment from the receiving device 102, adjust the independent parameter based on content of the proprietary packet for adjustment.

In this example, after the initial communication between the transmitting and receiving devices 104, 102 is established, the configuration unit 112 of the receiving device 102 first configures a default power capacity at the receiving device 102. The reading unit 114 of the receiving device 102 then reads a first value of a dependent parameter associated with the electric power 130. The dependent parameter varies in accordance with an independent parameter adjustable by the transmitting device 104. The communication unit 118 of the receiving device 102 then sends a proprietary packet for adjustment to the transmitting device 104. Upon receiving the proprietary packet for adjustment by the communication unit 128 of the transmitting device 104, the control unit 126 of the transmitting device 104 controls the power transmission unit 120 to adjust the independent parameter based on content of the proprietary packet for adjustment. The independent parameter is associated with the transmitted electric power 130. The reading unit 114 of the receiving device 102 then reads a second value of the dependent parameter, which varies in accordance with the adjustment of the independent parameter. Once the first and second values are available, the identification unit 116 identifies a maximum power capacity of the transmitting device 104 based on at least the first and second values and a predetermined threshold.

Figure 2:
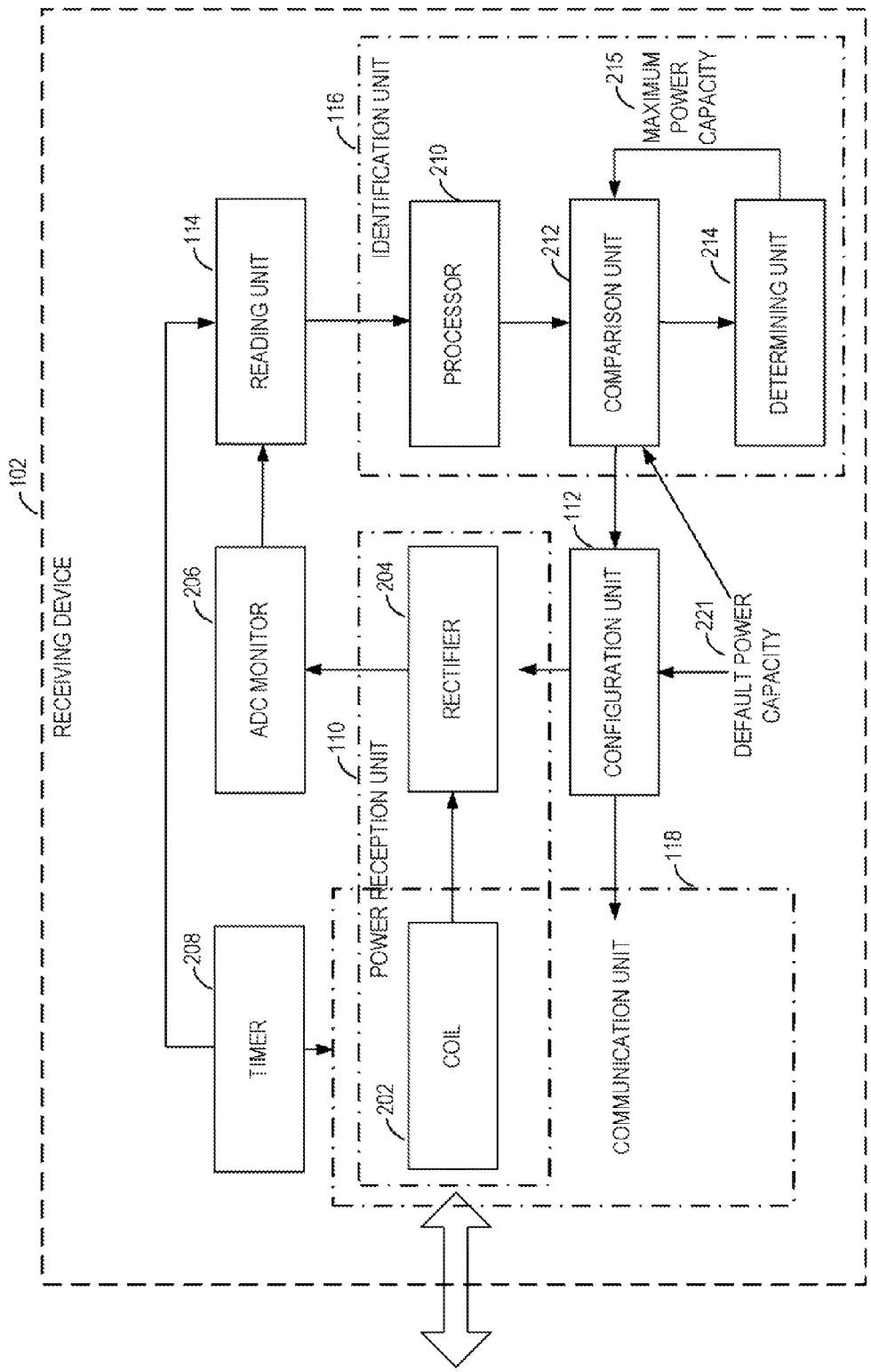
FIG. 2 is a block diagram illustrating an example of the receiving device shown in FIG. 1, in accordance with one embodiment of the present disclosure.

FIG. 2 illustrates one example of the receiving device 102, in accordance with one embodiment of the present disclosure. In this example, the receiving device 102 includes the power reception unit 110 having a coil 202 and a rectifier 204. In this example, the coil 202 is responsible for receiving magnetic field by its resonant circuit and converting it to an AC voltage signal. The rectifier 204 is configured to convert the AC voltage signal to a DC voltage signal. An ADC monitor 206 may be employed to detect any suitable electrical parameter associated with the received electric power 130, e.g., voltage, current, or power, and provide it to the reading unit 114. The electrical parameter provided to the reading unit 114 may be a dependent parameter varying in accordance with an independent parameter adjustable by the transmitting device 104. The independent parameter may be voltage, frequency, or duty cycle. The receiving device 102 in this example also includes the communication unit 118 having the coil 202. In one example, the communication unit 118 is configured to send a proprietary packet to the transmitting device 104 for notifying the transmitting device 104 a maximum power capacity of the receiving device 102.

The receiving device 102 in this example also includes a timer 208 operatively coupled to the reading unit 114 and the communication unit 118. In this example, after the reading unit 114 reads a first value of the dependent parameter, the communication unit 118 sends a proprietary packet for adjustment to the transmitting device 104, within a time interval controlled by the timer 208. The reading unit 114 reads a second value of the dependent parameter, after the timer 208 delays for the time interval, within which the independent parameter has been adjusted by the transmitting device 104.

The receiving device 102 in this example also includes the identification unit 116 having a processor 210, a comparison unit 212, and a determining unit 214. In this example, after the reading unit 114 reads the first and second values of the dependent parameter, the processor 210 calculates an output of a function. The function has inputs of at least the first and second values. The comparison unit 212 then compares the output with the predetermined threshold and provides an output to the determining unit 214, which may determine the maximum power capacity 215 of the transmitting device 104 based on at least the output of the comparison unit 212. In another example, the determining unit 214 may provide the maximum power capacity 215 to the comparison unit 212, for which to compare the maximum power capacity 215 with the default power capacity 221. If the maximum power capacity 215 is greater than the default power capacity 221, the configuration unit 112 configures a power capacity of the receiving device 102 based on the maximum power capacity 215 and the communication unit 118 sends a proprietary packet for acknowledgement and a proprietary packet for error control to the transmitting device 104.

Figure 9:
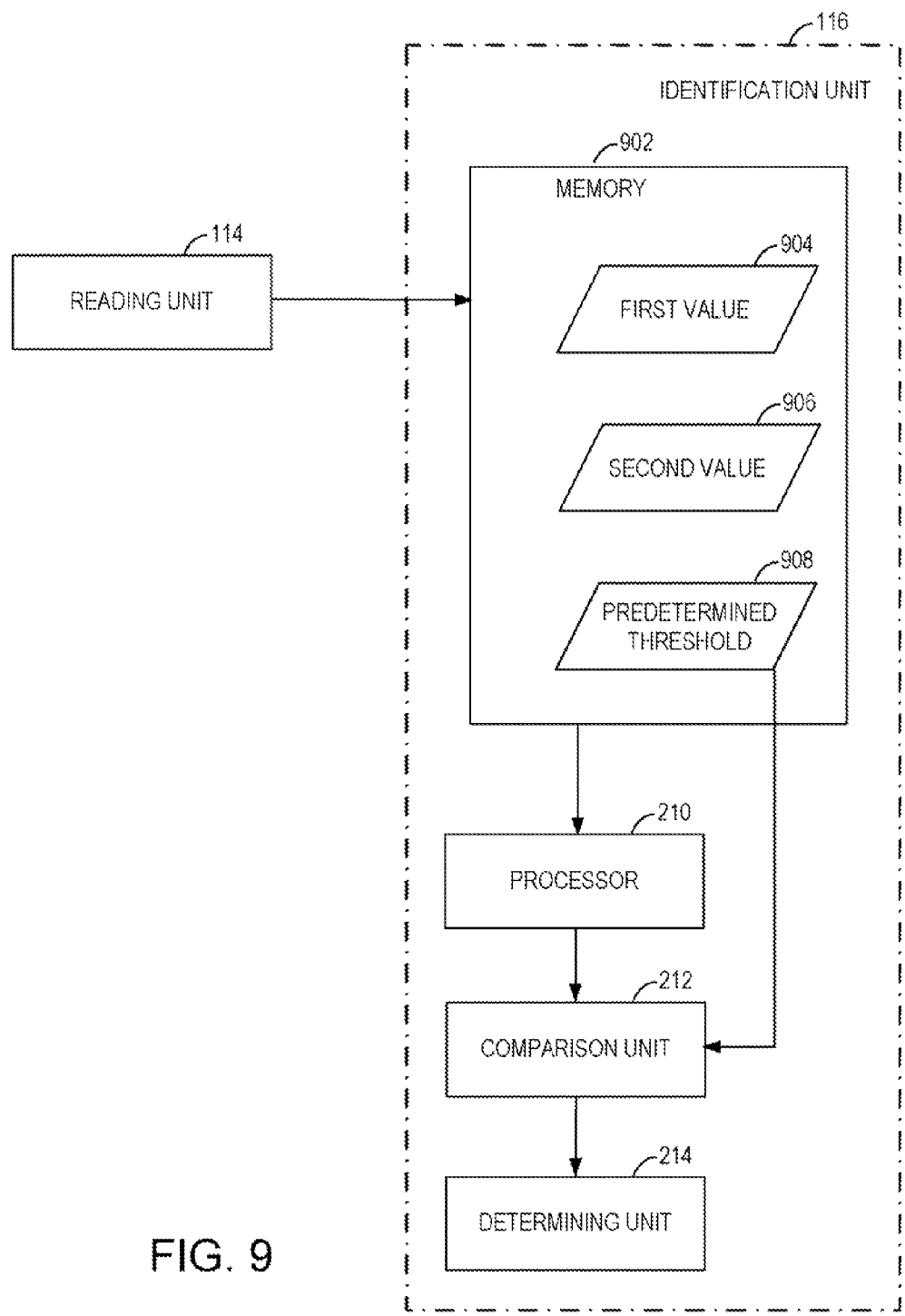
FIG. 9 is a block diagram illustrating an example of an identification unit in the receiving device shown in FIG. 2 including a processor and a memory, in accordance with one embodiment of the present disclosure.

In one example, as shown in FIG. 9, the identification unit 116 may be implemented by one or more processors 210 and memory 902. In this example, software programs and data may be loaded into the memory 902 and executed by the processor 210. The processor 210 may be any suitable processing unit, such as but not limited to, a microprocessor, a microcontroller, a central processing unit, an electronic control unit, etc. The memory 902 may be, for example, a discrete memory or a unified memory integrated with the processor 210. The data includes, for example, the first and second values 904, 906 of a dependent parameter, and a predetermined threshold 908. In one example, the dependent parameter is the DC voltage, and the predetermined threshold is set based on a function of the first and second values.

Figure 3:
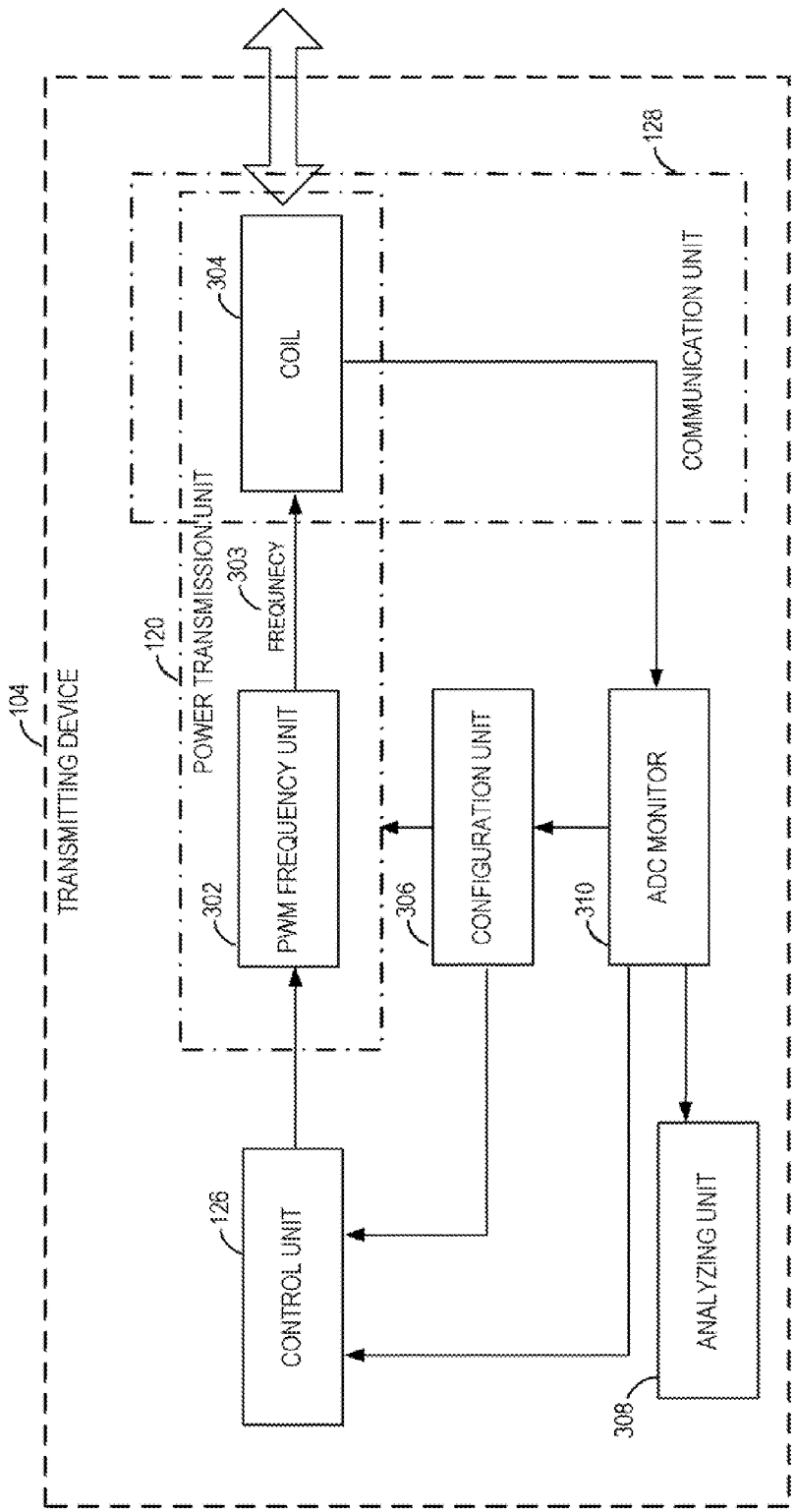
FIG. 3 is a block diagram illustrating an example of the transmitting device shown in FIG. 1, in accordance with one embodiment of the present disclosure.

FIG. 3 illustrates one example of the transmitting device 104, in accordance with one embodiment of the present disclosure. In this example, the transmitting device 104 includes a power transmission unit 120 having a PWM frequency unit 302 and a coil 304, a control unit 126, and a communication unit 128 having the coil 304. The communication unit 128 is responsible for receiving proprietary packets from the receiving device 102. Based on content of the received proprietary packet for adjustment, the control unit 126 is configured to adjust a corresponding independent parameter. In one example, the independent parameter is a PWM frequency 303, and the control unit 126 is configured to control the PWM frequency unit 302 to adjust the frequency 303 to a desired level. The PWM frequency unit 302 is responsible for converting a DC voltage signal to an AC voltage signal, and the coil 304 is responsible for converting the electric field of the AC voltage signal to the magnetic field. The transmitting device 104 in this example also includes a configuration unit 306 and an analyzing unit 308. In this example, if a proprietary packet for acknowledgement is received by the communication unit 128, the configuration unit 306 may configure a power capacity based on the maximum power capacity of the transmitting device 104; if the proprietary packet for acknowledgement is not received by the communication unit 128, the configuration unit 306 may configure a power capacity based on the default power capacity. The power transmission unit 120 then wirelessly transmits the electric power 130 with the configured power capacity to the receiving device 102. Also, if a proprietary packet for error control is received by the communication unit 128, the analyzing unit 308 may analyze the proprietary packet for error control. An ADC monitor 310 may also be included in the transmitting device 104 to provide levels of electrical parameters, such as voltage and current, to the control unit 126 for parameter adjustment, to the configuration unit 306 for power capacity configuration, and to the analyzing unit 308 for packet analysis.

Figure 4:
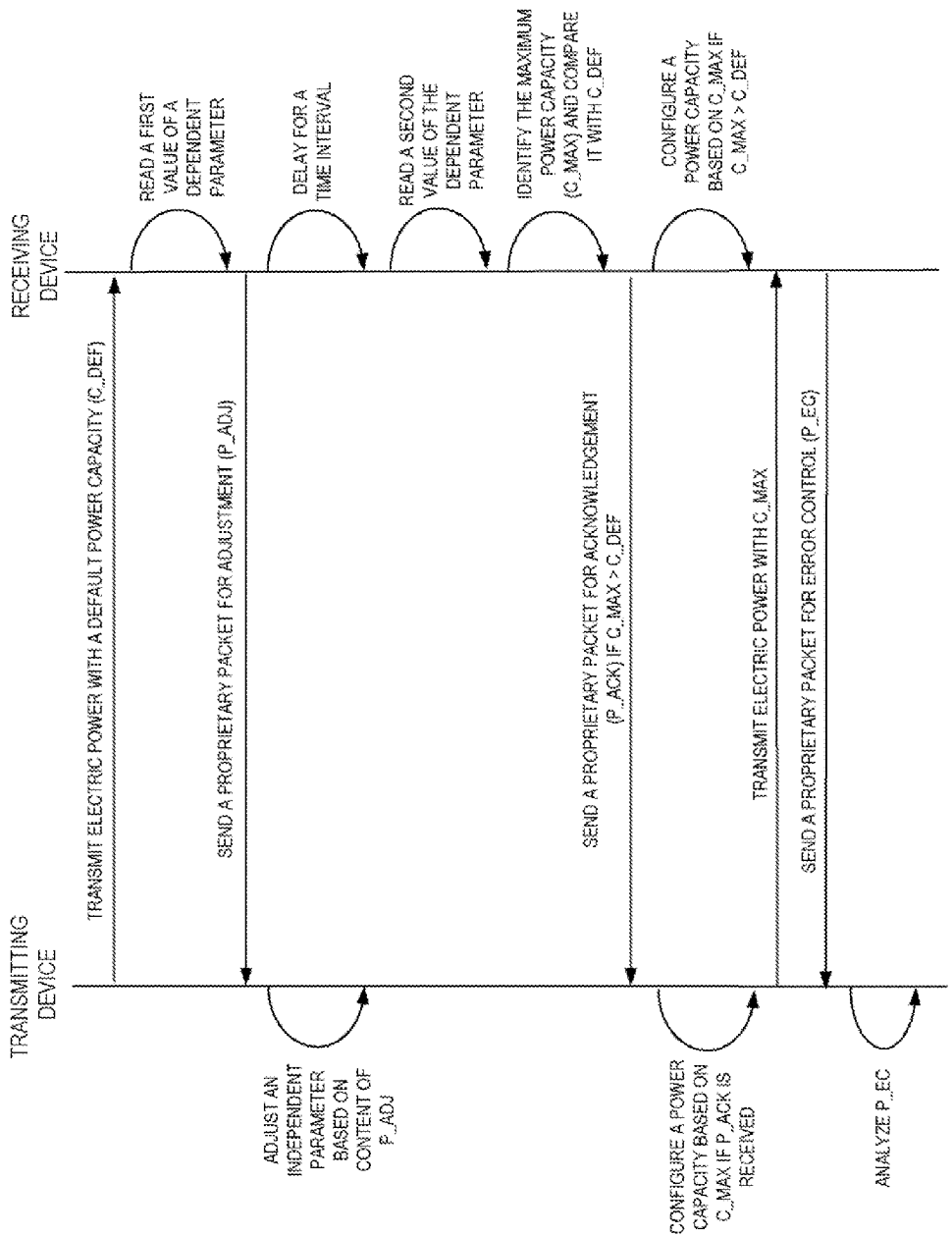
FIG. 4 is a time line chart illustrating an example of wireless power transmission, in accordance with one embodiment of the present disclosure.

FIG. 4 is a time line chart illustrating an example of wireless power transmission, in accordance with one embodiment of the present disclosure. Initially, communication between the transmitting device 104 and receiving device 102 is established with a default power capacity (C_DEF) at a default frequency. According to the QI communication protocol, the default power capacity is 5 W, and the default frequency is 175 kHz. Once the initial communication is established, the receiving device 102 reads a first value of a dependent parameter associated with the electric power, e.g., the output voltage. It is known that the output voltage of the received electric power varies in accordance with an independent parameter, e.g., the PWM frequency. The higher the PWM frequency is, the lower the output voltage is. In this example, after receiving a proprietary packet for adjustment (P_ADJ) sent by the receiving device 102, the transmitting device 104 adjusts the PWM frequency to a target level different than the default frequency of 175 kHz, within a time interval. In one example, the target level of frequency is lower than the default frequency, e.g., 160 kHz. In another example, the target level of frequency is greater than the default frequency, e.g., 190 kHz. The receiving device 102 delays for the time interval and then reads a second value of the dependent parameter, or the output voltage in this example.

The receiving device 102 then identifies the maximum power capacity (C_MAX) and compares it with C_DEF. In the example mentioned above, the transmitting device 104 may be a device with relatively high load-driving capacity, e.g., a transmitting device with 10 W C_MAX. The receiving device 102 in this example may identify C_MAX in the following way.

The receiving device 102 first calculates a function of the two values of output voltage. An output of the function may be an absolute value of a difference between the two values. The output is compared by the receiving device 102 with a predetermined threshold, which may correspond to a desired change of output voltage in accordance with a given adjustment of the PWM frequency, e.g., from 175 kHz to 160 kHz. The receiving device 102 then determines C_MAX based on a result of the comparison. For example, if the absolute value of the voltage difference is below a threshold, C_MAX may be identified to be the same as C_DEF, e.g., 5 W in the current QI communication protocol. This is because the PWM frequency based on the QI communication protocol is fixed to 175 kHz, and hence the corresponding output voltage change is not very big. On the other hand, if the absolute value of the voltage difference is above a threshold, C_MAX may be identified to be a value greater than C_DEF, e.g., 10 W.

In this example, a proprietary packet for acknowledgement (P_ACK) is sent from the receiving device 102 to the transmitting device 104, if C_MAX is greater than C_DEF. Then both the transmitting and receiving devices 104, 102 configure a power capacity based on C_MAX. The electric power is then transmitted from the transmitting device 104 to the receiving device 102 at a frequency corresponding to a power capacity C_MAX. The receiving device 102 then regularly sends a proprietary packet for error control (P_EC) to the transmitting device 104, which analyzes P_EC to obtain data for control error.

It is understood that the receiving device 102 may notify the transmitting device 104 a maximum power capacity of the receiving device 102, by sending either a proprietary packet or a standard packet according to the QI communication protocol. As a consequence, the receiving device 102 and the transmitting device 104 know each other's maximum power capacity for wireless power transmission.

Figure 5:
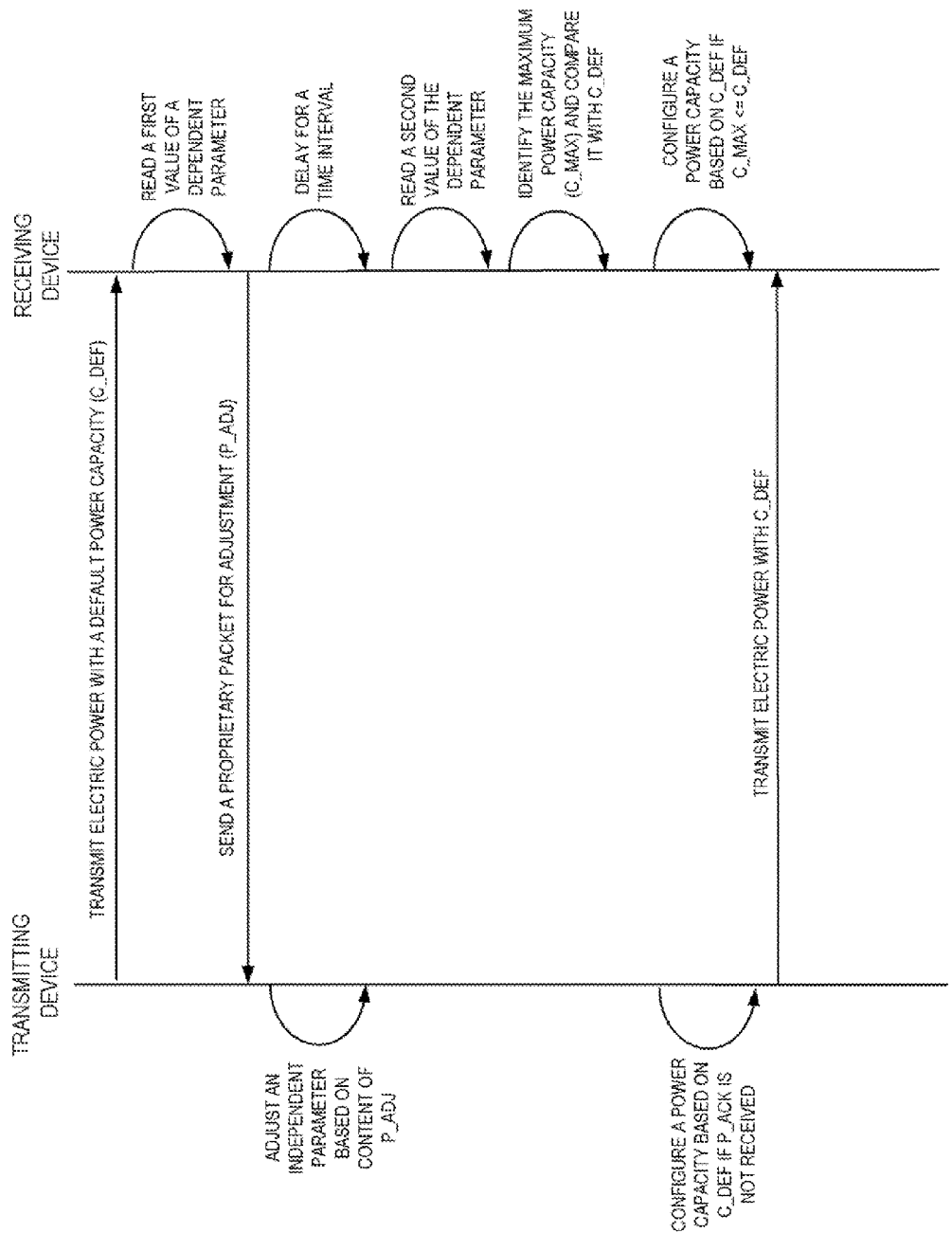
FIG. 5 is a time line chart illustrating another example of wireless power transmission, in accordance with one embodiment of the present disclosure.

FIG. 5 is a time line chart illustrating another example of wireless power transmission, in accordance with one embodiment of the present disclosure. In this example, the transmitting device 104 may be a device with relatively low load-driving capacity, e.g., a QI-compatible 5 W transmitting device. In this example, the C_MAX identified by the receiving device 102 may be not greater than C_DEF. As a result, the transmitting device 104 may not receive P_ACK from the receiving device 102. Then both the transmitting and receiving devices 104, 102 configure or keep a power capacity based on C_DEF. The electric power is then transmitted from the transmitting device 104 to the receiving device 102 at a frequency corresponding to a power capacity C_DEF.

It is understood that if the power capacity is not greater than C_DEF, the receiving device 102 does not have to send proprietary packets and may send standard packets including a control error packet according to the QI communication protocol. Accordingly, the receiving device 102 may support wireless power transmissions both with C_DEF and with a C_MAX that is greater than C_DEF. By doing so, the receiving device 102 is able to adaptively receive electric power with a wide range of power capacity while still being compatible with existing standards, such as the QI communication protocol. More generally, embodiments of the present disclosure enable compatible wireless power transmissions between a high C_MAX transmitter and a low C_DEF receiver, between a low C_DEF transmitter and a high C_MAX receiver, and between a high C_MAX transmitter and a high C_MAX receiver. According to some embodiments, a receiver is not able to or not configured to support a power capacity higher than C_DEF. In that situation, no P_ADJ will be sent to a corresponding transmitter, and wireless power may be transmitted from the transmitter to the receiver with the default power capacity C_DEF.

Figure 6:
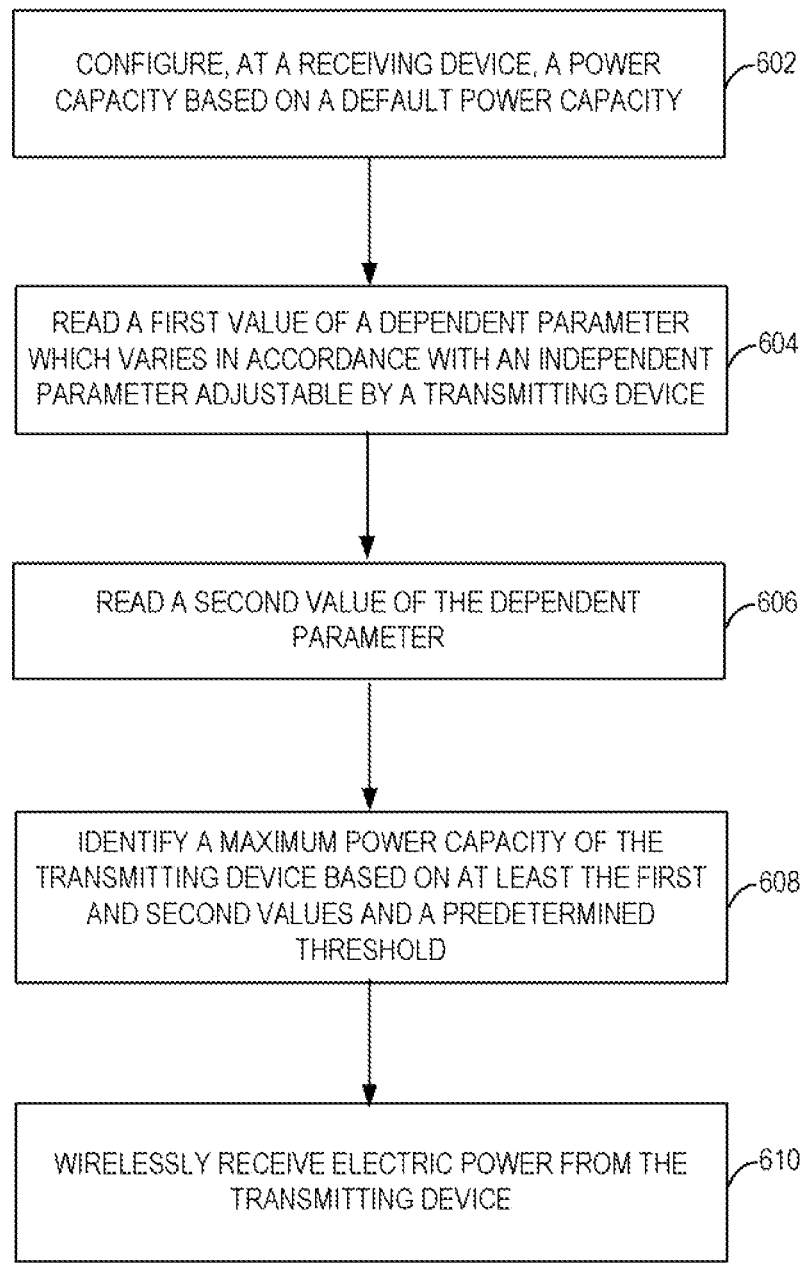
FIG. 6 is a flow chart illustrating an example of a method for wireless power transmission, in accordance with one embodiment of the present disclosure.

FIG. 6 depicts one example of a method for wireless power transmission, in accordance with one embodiment of the present disclosure. It will be described with reference to the above figures. However, any suitable unit may be employed. Beginning at block 602, a power capacity is configured at the receiving device 102 based on a default power capacity known by both the receiving device 102 and the transmitting device 104. Proceeding to block 604, a first value of a dependent parameter is read. The dependent parameter varies in accordance with an independent parameter adjustable by the transmitting device 104. Moving to block 606, after the independent parameter is adjusted by the transmitting device 104, a second value of the dependent parameter is read. Regarding block 608, based on at least the first and second values and a predetermined threshold, a maximum power capacity of the transmitting device 104 is identified. Then in block 610, the electric power is received from the transmitting device 104. As described above, blocks 602-610 may be performed by the receiving device 102.

Figure 7:
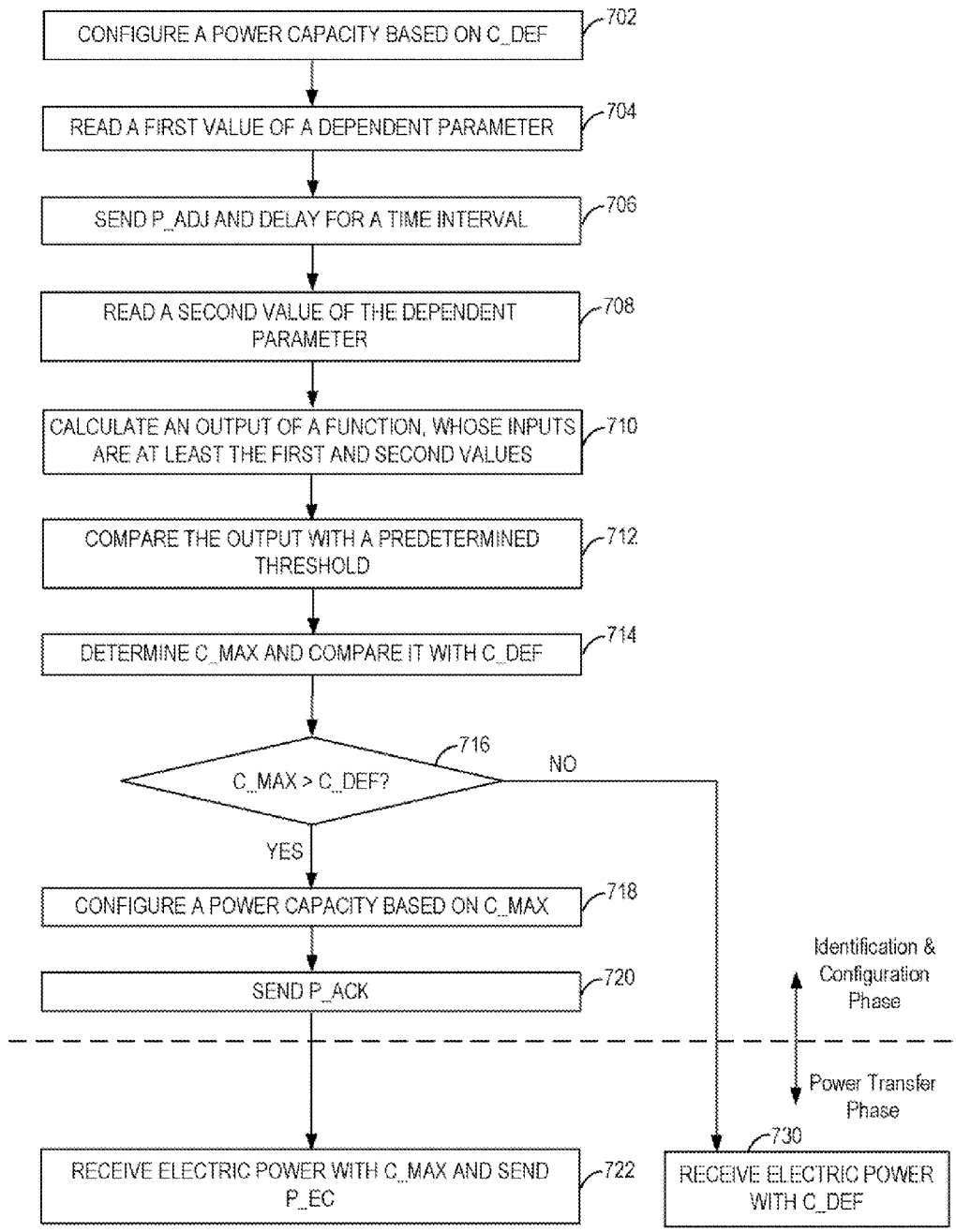
FIG. 7 is a flow chart illustrating another example of a method for wireless power transmission, in accordance with one embodiment of the present disclosure.

FIG. 7 depicts another example of the method for wireless power transmission, in accordance with one embodiment of the present disclosure. It will be described with reference to the above figures. However, any suitable unit may be employed. The wireless power transmission starts with an identification and configuration phase. Beginning at block 702, a power capacity is configured at the receiving device 102 based on a default power capacity C_DEF known by both the receiving device 102 and the transmitting device 104. As described above, this may be performed by the configuration unit 112 of the receiving device 102. Moving to block 704, a first value of a dependent parameter is read. The dependent parameter includes, for example, voltage, current, and power, and varies in accordance with an independent parameter adjustable by the transmitting device 104. The independent parameter includes, for example, voltage, frequency, and duty cycle. At this point, the receiving device 102 may send a standard or proprietary packet to the transmitting device 104 for notifying the transmitting device 104 a maximum power capacity of the receiving device 102 (not shown in FIG. 7). At block 706, a proprietary packet for adjustment P_ADJ is sent to the transmitting device 104, and reading operation is delayed for a time interval. A time interval between two consecutive packets is set as 0 to 21 ms. Accordingly in this example, the time interval delayed after sending P_ADJ may be about 10 ms. During the 10 ms, the transmitting device 104 adjusts the independent parameter (e.g., frequency) based on content of P_ADJ. And at block 708, a second value of the dependent parameter is read after the delay. As described above, blocks 704, 706, and 708 may be performed by the reading unit 114 in conjunction with the communication unit 118 and the timer 208 of the receiving device 102. In accordance with some embodiments, the receiving device 102 is not able to or not configured to support a power capacity higher than C_DEF. In that situation, the receiving device 102 may not send P_ADJ to the transmitting device 104 and does not have to read values of the dependent parameter. Accordingly, wireless power may be transmitted from the transmitting device 104 to the receiving device 102 with the default power capacity C_DEF.

Moving to block 710, an output of a function is calculated. The function has inputs of at least the first and second values. At block 712, the output is compared with a predetermined threshold. Then in block 714, a maximum power capacity C_MAX of the transmitting device 104 is determined based on at least a result of the comparison in 712, and is compared with a default power capacity C_DEF. In one example not shown in FIG. 7, a second P_ADJ may be sent to the transmitting device 104. Accordingly, a third value of the dependent parameter may be read. A function may be calculated with inputs of the three values and two outputs, which may be compared with two predetermined thresholds. And C_MAX may be determined based on results of the two comparisons. In one specific example, the independent parameter may be frequency at the transmitting device 104, which is set to default value of 175 kHz at first, and then adjusted to 160 kHz and 190 kHz based on contents of the two P_ADJs. And the dependent parameter may be output voltage at the receiving device 102, which varies in accordance with the frequency. As described above, blocks 710, 712, and 714 may be performed by the processor 210, the comparison unit 212, and the determining unit 214 in the identification unit 116 of the receiving device 102.

At block 716, whether C_MAX is greater than C_DEF is determined. This may be performed by the comparison unit 212 or another comparison unit of the receiving device 102. If C_MAX is greater than C_DEF, process continues to block 718, where a power capacity is configured based on C_MAX. As described above, this may be performed by the configuration unit 112 of the receiving device 102. At block 720, a proprietary packet for acknowledgement (P_ACK) is sent for acknowledging the transmitting device the determination of C_MAX and the configuration based on C_MAX. This may be performed by the communication unit 118. The identification and configuration phase may end by sending a configuration packet (not shown in FIG. 7), in accordance with the QI communication protocol.

Moving to block 722, the wireless power transmission enters a power transfer phase. The electric power is received at the receiving device 102 with a power capacity C_MAX, and a proprietary packet for error control (P_EC) is sent to the transmitting device 104. As described above, this may be performed by the power reception unit 110 in conjunction with the communication unit 118 of the receiving device 102. According to various embodiments, more proprietary packets may be sent regularly in the power transfer phase.

For example, a list of various packets is illustrated in FIG. 10, with formats according to the QI communication protocol. The table in FIG. 10 includes column 1002 showing headers for various packets, column 1004 showing packet types for corresponding packets, and column 1006 showing message sizes with byte as a unit for corresponding packets.

When a header of a packet is analyzed, the corresponding packet type and message size for the packet can be identified. There are standard packets defined in the QI communication protocol, including e.g., a 0x51 Configuration packet in the identification and configuration phase and a 0x03 Control Error packet in the power transfer phase. Proprietary shown in column 1004 denotes a proprietary packet, which may have an extended definition in a specific example and may be used in both the identification and configuration phase and the power transfer phase. In this example, 0x18 may be used for P_ADJ in the identification and configuration phase, 0x19 may be used for P_ACK in the identification and configuration phase, and 0x19 may be used for P_EC in the power transfer phase while 0x03 is kept with a control error value of 0.

On the other hand, if C_MAX is not greater than C_DEF in block 716, process goes to block 730, where the wireless power transmission enters the power transfer phase, and the electric power is received with a power capacity C_DEF. As described above, this may be performed by the power reception unit 110 of the receiving device 102.

Figure 8:
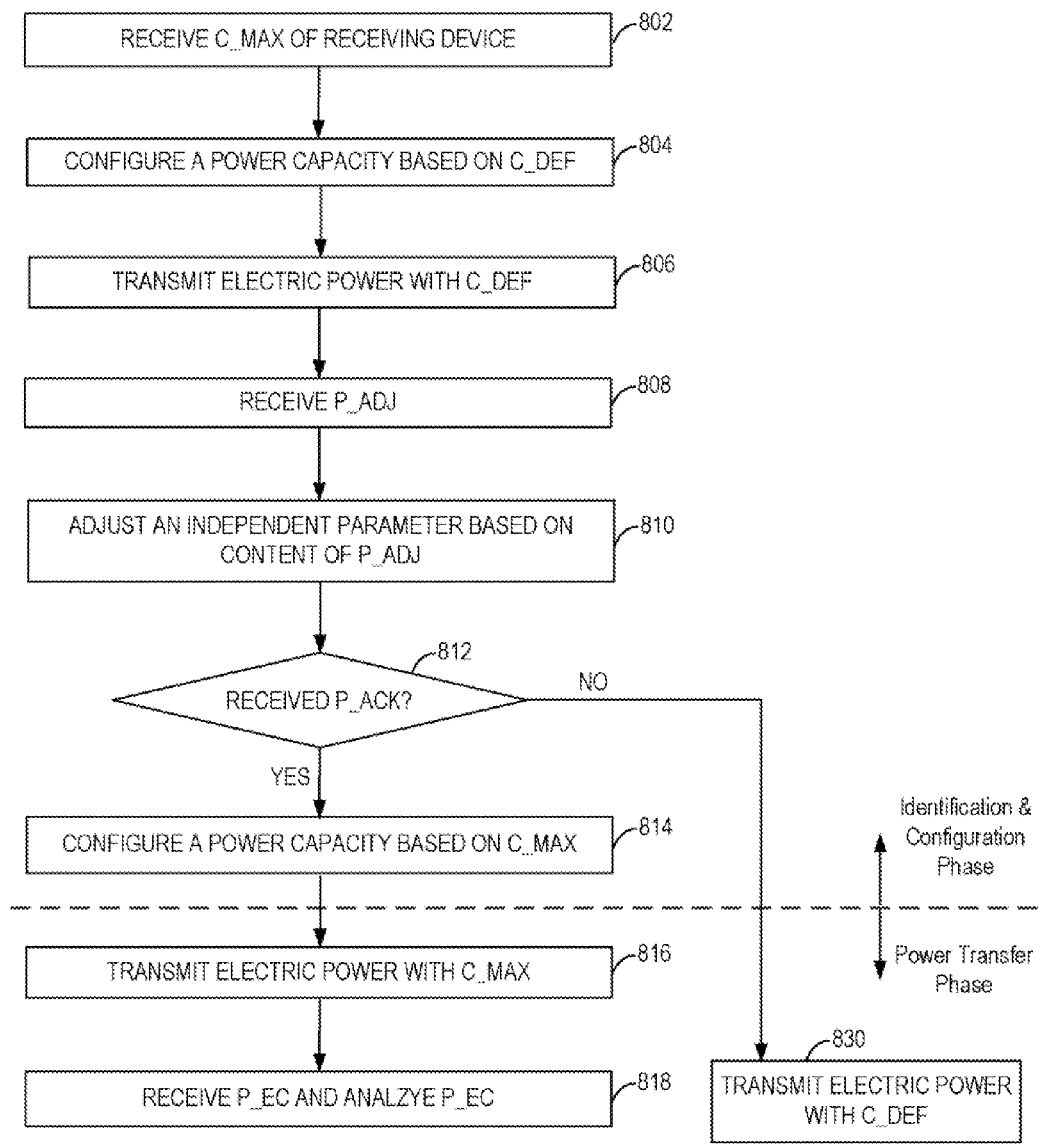
FIG. 8 is a flow chart illustrating still another example of a method for wireless power transmission, in accordance with one embodiment of the present disclosure.

FIG. 8 depicts still another example of the method for wireless power transmission, in accordance with one embodiment of the present disclosure. It will be described with reference to the above figures. However, any suitable unit may be employed. Again, the wireless power transmission starts with the identification and configuration phase. At block 802, C_MAX of the receiving device 102 is received. This may be performed by the communication unit 128 of the transmitting device 104. Moving to block 804, a power capacity is configured based on C_DEF. As described above, this may be performed by the configuration unit 306 of the transmitting device 104. At block 806, the electric power with a frequency determined based on a power capacity C_DEF is transmitted to the receiving device 102. As described above, this may be performed by the power transmission unit 120 of the transmitting device 104. Then at block 808, the proprietary packet P_ADJ is received at the transmitting device 104. This may be performed by the communication unit 128 in conjunction with the ADC monitor 310. Moving to block 810, an independent parameter is adjusted based on content of P_ADJ. The independent parameter may be voltage, frequency, or duty cycle of frequency. As described above, this may be performed by the control unit 126 in conjunction with the PWM frequency unit 302 in the power transmission unit 120 of the transmitting device 104.

Moving to block 810, whether the proprietary packet P_ACK has been received is determined. This may be performed by the control unit 126 in conjunction with the ADC monitor 310 of the transmitting device 104. If P_ACK has been received, process continues to block 814, where a power capacity is configured based on C_MAX of the transmitting device 104. As described above, this may be performed by the configuration unit 306 of the transmitting device 104. Moving to block 816, the wireless power transmission enters the power transfer phase. The electric power is transmitted to the receiving device 102 with a power capacity C_MAX. This may be performed by the power transmission unit 120 of the transmitting device 104. Then at block 818, the proprietary packet P_EC is received and analyzed at the transmitting device 104. As described above, this may be performed by the analyzing unit 308 in conjunction with the communication unit 128 and the ADC monitor 310 of the transmitting device 104.

On the other hand, if P_ACK is not received in block 812, process goes to block 830, where the wireless power transmission enters the power transfer phase, and the electric power is transmitted with a power capacity C_DEF. As described above, this may be performed by the power transmission unit 120 of the transmitting device 104, maybe in conjunction with the configuration unit 306 and the control unit 126.

Aspects of the method for wireless power transmission, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. A method for a receiving device to wirelessly receive electric power from a transmitting device, the method comprising the steps of:
   configuring, at the receiving device, a power capacity based on a default power capacity known by both the receiving device and the transmitting device;
   reading a first value of a dependent parameter associated with the electric power, wherein the dependent parameter varies in accordance with an independent parameter adjustable by the transmitting device;
   reading a second value of the dependent parameter;
   identifying a maximum power capacity of the transmitting device based on at least the first and second values and a predetermined threshold; and
   receiving the electric power from the transmitting device.

2. The method of claim 1, wherein the dependent parameter is at least one of voltage, current, and power.

3. The method of claim 1, wherein the independent parameter is at least one of voltage, frequency, and duty cycle.

4. The method of claim 1, further comprising the steps of:
   sending a proprietary packet for adjustment to the transmitting device after reading the first value; and
   delaying for a time interval before reading the second value.

5. The method of claim 4, further comprising the step of:
   upon receiving the proprietary packet for adjustment, adjusting, by the transmitting device, the independent parameter based on content of the proprietary packet in the time interval.

6. The method of claim 1, wherein the step of identifying a maximum power capacity of the transmitting device further comprises:
   calculating an output of a function, wherein the function has inputs of at least the first and second values;
   comparing the output with the predetermined threshold, and
   determining the maximum power capacity of the transmitting device based on at least a result of the comparison.

7. The method of claim 1, further comprising the steps of:
   once the maximum power capacity of the transmitting device is identified, comparing the maximum power capacity with the default power capacity;
   configuring a power capacity of the receiving device based on the maximum power capacity if the maximum power capacity is greater than the default power capacity; and
   sending a proprietary packet for acknowledgement and a proprietary packet for error control to the transmitting device if the maximum power capacity is greater than the default power capacity.

8. The method of claim 7, further comprising the steps of:
   configuring, by the transmitting device, a power capacity based on the maximum power capacity, if the proprietary packet for acknowledgement is received;
   configuring, by the transmitting device, a power capacity based on the default power capacity, if the proprietary packet for acknowledgement is not received;
   wirelessly transmitting, by the transmitting device, the electric power with the configured power capacity to the receiving device; and
   analyzing, by the transmitting device, the proprietary packet for error control, if the proprietary packet for error control is received.

9. The method of claim 1, further comprising the step of sending a proprietary packet to the transmitting device for notifying the transmitting device a maximum power capacity of the receiving device.

10. An apparatus comprising a receiving device comprising:
    a power reception unit configured to wirelessly receive electric power from a transmitting device;
    a configuration unit operatively coupled to the power reception unit and configured to configure a power capacity based on a default power capacity known by both the receiving device and the transmitting device;
    a reading unit operatively coupled to the power reception unit and configured to:
       read a first value of a dependent parameter associated with the electric power, wherein the dependent parameter varies in accordance with an independent parameter adjustable by the transmitting device, and
       read a second value of the dependent parameter; and
    an identification unit operatively coupled to the configuration unit and the reading unit and configured to identify a maximum power capacity of the transmitting device based on at least the first and second values and a predetermined threshold.

11. The apparatus of claim 10, wherein the dependent parameter is at least one of voltage, current, and power.

12. The apparatus of claim 10, wherein the independent parameter is at least one of voltage, frequency, and duty cycle.

13. The apparatus of claim 10, further comprising:
    a communication unit operatively coupled to the configuration unit and the power reception unit and configured to send a proprietary packet for adjustment to the transmitting device after the reading unit reads the first value; and
    a timer operatively coupled to the reading unit and the communication unit and configured to delay for a time interval before the reading unit reads the second value.

14. The apparatus of claim 10, wherein the identification unit further comprises:
    a processor configured to calculate an output of a function, wherein the function has inputs of at least the first and second values;
    a comparison unit configured to compare the output with the predetermined threshold; and
    a determining unit configured to determine the maximum power capacity of the transmitting device based on at least an output of the comparison unit.

15. The apparatus of claim 10, further comprising:
    a comparison unit configured to compare the maximum power capacity of the transmitting device with the default power capacity, once the maximum power capacity is identified by the identification unit; and a communication unit configured to send a proprietary packet for acknowledgement and a proprietary packet for error control to the transmitting device if the maximum power capacity is greater than the default power capacity, wherein the configuration unit is further configured to configure a power capacity of the receiving device based on the maximum power capacity if the maximum power capacity is greater than the default power capacity.

16. The apparatus of claim 10, further comprising:
a communication unit configured to send a proprietary packet to the transmitting device for notifying the transmitting device a maximum power capacity of the receiving device.

17. A system for wirelessly receiving power comprising:
a receiving device comprising:
    a power reception unit configured to wirelessly receive electric power from a transmitting device;
    a configuration unit operatively coupled to the power reception unit and configured to configure a power capacity based on a default power capacity known by both the receiving device and the transmitting device;
    a reading unit operatively coupled to the power reception unit and configured to:
        read a first value of a dependent parameter associated with the electric power, wherein the dependent parameter varies in accordance with an independent parameter adjustable by the transmitting device, and
        read a second value of the dependent parameter, and
    an identification unit operatively coupled to the configuration unit and the reading unit and configured to identify a maximum power capacity of the transmitting device based on at least the first and second values and a predetermined threshold; and
a transmitting device comprising a power transmission unit configured to wirelessly transmit the electric power to the receiving device.

18. The system of claim 17, wherein the dependent parameter is at least one of voltage, current, and power.

19. The system of claim 17, wherein the independent parameter is at least one of voltage, frequency, and duty cycle.

20. The system of claim 17, wherein the receiving device further comprises:
a communication unit operatively coupled to the configuration unit and the power reception unit and configured to send a proprietary packet for adjustment to the transmitting device after the reading unit reads the first value; and
a timer operatively coupled to the reading unit and the communication unit and configured to delay for a time interval before the reading unit reads the second value.

21. The system of claim 20, wherein the transmitting device further comprises:
a communication unit operatively coupled to the power transmission unit and configured to receive the proprietary packet for adjustment; and
a control unit operatively coupled to the power transmission unit and the communication unit and configured to, upon receiving the proprietary packet for adjustment, adjust the independent parameter based on content of the proprietary packet for adjustment in the time interval.

22. The system of claim 17, wherein the identification unit further comprises:
a processor configured to calculate an output of a function, wherein the function has inputs of at least the first and second values,
a comparison unit configured to compare the output with the predetermined threshold; and
a determining unit configured to determine the maximum power capacity of the transmitting device based on at least an output of the comparison unit.

23. The system of claim 17, wherein the receiving device further comprises:
a comparison unit configured to compare the maximum power capacity of the transmitting device with the default power capacity, once the maximum power capacity is identified by the identification unit; and
a communication unit configured to send a proprietary packet for acknowledgement and a proprietary packet for error control to the transmitting device if the maximum power capacity is greater than the default power capacity, wherein the configuration unit is further configured to configure a power capacity of the receiving device based on the maximum power capacity if the maximum power capacity is greater than the default power capacity.

24. The system of claim 23, wherein the transmitting device further comprises:
a configuration unit configured to:
    configure a power capacity based on the maximum power capacity, if the proprietary packet for acknowledgement is received, and
    configure a power capacity based on the default power capacity, if the proprietary packet for acknowledgement is not received, and
an analyzing unit configured to analyze the proprietary packet for error control, if the proprietary packet for error control is received.

25. The system of claim 17, wherein the receiving device further comprises:
a communication unit configured to send a proprietary packet to the transmitting device for notifying the transmitting device a maximum power capacity of the receiving device.

26. A machine-readable tangible and non-transitory medium having information recorded thereon for a receiving device to wirelessly receive electric power from a transmitting device, wherein the information, when read by the machine, causes the machine to perform the following:
configuring, at the receiving device, a power capacity based on a default power capacity known by both the receiving device and the transmitting device;
reading, by the receiving device, a first value of a dependent parameter associated with the electric power, wherein the dependent parameter varies in accordance with an independent parameter adjustable by the transmitting device;
reading, by the receiving device, a second value of the dependent parameter;
identifying, by the receiving device, a maximum power capacity of the transmitting device based on at least the first and second values and a predetermined threshold; and
receiving, by the receiving device, the electric power from the transmitting device.

27. A method for a receiving device to wirelessly receive electric power from a transmitting device, the method comprising the steps of:

configuring, at the transmitting device, a power capacity based on a default power capacity known by both the receiving device and the transmitting device; and transmitting the electric power to the receiving device, wherein the receiving device reads a first value and a second value of a dependent parameter associated with the electric power, and identifies a maximum power capacity of the transmitting device based on at least the first and second values and a predetermined threshold, and wherein the dependent parameter varies in accordance with an independent parameter adjustable by the transmitting device.

28. The method of claim 27, further comprising the steps of:

adjusting the independent parameter based on content of a proprietary packet for adjustment sent by the receiving device;

configuring a power capacity based on the maximum power capacity, if a proprietary packet for acknowledgement is received;

configuring a power capacity based on the default power capacity, if the proprietary packet for acknowledgement is not received;

wirelessly transmitting the electric power with the configured power capacity to the receiving device; and analyzing a proprietary packet for error control, if the proprietary packet for error control is received.

29. An apparatus comprising a transmitting device comprising:

a configuration unit configured to configure a power capacity based on a default power capacity known by both a receiving device and the transmitting device; and a power transmission unit operatively coupled to the configuration unit and configured to transmit electric power to the receiving device, wherein the receiving device reads a first value and a second value of a dependent parameter associated with the electric power, and identifies a maximum power capacity of the transmitting device based on at least the first and second values and a predetermined threshold, and wherein the dependent parameter varies in accordance with an independent parameter adjustable by the transmitting device.

* * * * *